United States Patent
Maeda

[11] Patent Number: 6,000,164
[45] Date of Patent: Dec. 14, 1999

[54] FISHING ROD

[76] Inventor: Masashi Maeda, 38-10, Kichijojihigashi-cho 2-chome, Musashino-shi, Tokyo, Japan

[21] Appl. No.: 08/947,195

[22] Filed: Oct. 8, 1997

[51] Int. Cl.[6] ........................................ A01K 87/00
[52] U.S. Cl. .................................. 43/18.1; 43/17
[58] Field of Search ................. 43/20, 22, 17, 43/42.72, 18.1, 18.5, 23, 24

[56] References Cited

U.S. PATENT DOCUMENTS

| | | | |
|---|---|---|---|
| 2,194,639 | 3/1940 | Cole | 43/18 |
| 3,680,244 | 8/1972 | Cala | 43/17 |
| 4,027,419 | 6/1977 | Popeil | 43/18 R |
| 4,726,139 | 2/1988 | Tokuda | 43/22 |
| 4,905,398 | 3/1990 | Bothyl | 43/17 |

FOREIGN PATENT DOCUMENTS

| | | | |
|---|---|---|---|
| 24294 | 11/1950 | Finland | 43/18.1 |
| 214285 | 7/1967 | Sweden | 43/18.1 |
| 1286242 | 8/1972 | United Kingdom | 43/17 |

*Primary Examiner*—Jack W. Lavinder
*Attorney, Agent, or Firm*—Browdy and Neimark

[57] ABSTRACT

A fishing rod comprises: a handle 1 having a reel pedestal fixing device 4 mounted on the lower surface thereof, a fishing rod member 2 having one or more fishing-line-guiding rings 5 mounted on the lower surface thereof, and a strike amplifying elastic subsidiary fishing rod 50 which is located below the fishing rod member 2 and which is shorter than the latter. The fishing rod member 2 and the strike amplifying elastic subsidiary fishing rod 50 are connected to the leading end of the handle 2. The strike amplifying elastic subsidiary fishing rod 50 is spaced apart from and in parallel relationship with the fishing rod member 2, or is spaced apart increasingly little by little from the latter towards the leading end thereof and is also in approximately parallel relationship with the latter. The fishing rod is characterized in that the strike amplifying elastic subsidiary fishing rod 50 has one or more fishing-line-guiding rings 5' mounted on the leading end thereof.

4 Claims, 11 Drawing Sheets

FISHING ROD

BACKGROUND OF THE INVENTION

1. Field of the Invention

The present invention relates to a fishing rod which is suitable, particularly for fishing on board a ship and whereby a strike by a fish can be detected easily by its amplification of the flexure of the fishing rod.

2. Description of the Prior Art

In case of fishing on board a ship, if it is necessary to cast a fishing line in the distance, a fishing rod having a spinning reel mounted on the lower surface thereof has heretofore been used. Such a fishing rod has, as a matter of course, a plurality of fishing-line-guiding rings mounted on the lower surface of the leading end thereof.

When a fish is hooked, the fishing rod is flexed in response to the tug of the fish transmmited on the fishing line so that a strike can be detected by a fisherman.

However, in case of the publicly known fishing rods having spinning reels mounted on the lower surface thereof, since the flexure of the fishing rod is directly related to a tug of a fish, when the magnitude of the tug is small, the flexure of the fishing rod becomes small so that in many cases it is not easy for fishermen to detect a strike transmmited on a fishing line.

SUMMARY OF THE INVENTION

The present invention has been made in view of the above-mentioned circumstances in the prior art, and has for its object to provide a fishing rod which is suitable, particularly for fishing on board a ship and whereby the flexure of the fishing rod due to the tug of a fish can be amplified to enable a fisherman to detect a strike more clearly and sensitively.

To achieve the above-mentioned object, according to a first aspect of the present invention, there is provided a fishing rod comprising: a handle having a reel pedestal fixing device mounted on the lower surface thereof, a fishing rod member having one or more fishing-line-guiding rings mounted on the lower surface thereof, and a strike amplifying elastic subsidary fishing rod which is located below the fishing rod member and which is shorter than the latter, said fishing rod member and said strike amplifying elastic subsidary fishing rod being connected to the leading end of said handle, said strike amplifying elastic subsidary fishing rod being spaced apart from and in parallel relationship with said fishing rod member, or being spaced apart increasingly little by little from the latter towards the leading end thereof and also being in approximately parallel relationship with the latter, characterized in that said strike amplifying elastic subsidary fishing rod has one or more fishing-line-guiding rings mounted on the leading end thereof.

According to a second aspect of the present invention, there is provided a fishing rod comprising: a handle having a reel pedestal fixing device mounted on the lower surface thereof, a fishing rod member having one or more fishing-line-guiding rings mounted on the lower surface thereof, and a strike detecting grip handle which is located below the fishing rod member, said fishing rod member and said strike detecting grip handle being connected to the leading end of said handle, said strike detecting grip handle being spaced apart from and in parallel relationship with said fishing rod member, characterized in that said strike detecting grip handle further has a strike amplifying elastic subsidary fishing rod connected to and fixedly secured to the leading end thereof, said strike amplifying elastic subsidary fishing rod having one or more fishing-line-guiding rings mounted on the leading end thereof, said strike amplifying elastic subsidary fishing rod being spaced apart from and in parallel relationship with said fishing rod member, or being spaced apart increasingly little by little from the latter towards the leading end thereof and also being in approximately parallel relationship with the latter, and the total length of said strike detecting grip handle and said strike amplifying elastic subsidary fishing rod being shorter than the length of said fishing rod member.

According to a third aspect of the present invention, there is provided a fishing rod comprising: a handle, a fishing rod member having one or more fishing-line-guiding rings mounted on the lower surface thereof, and a strike detecting grip handle which is located below the fishing rod member, said fishing rod member and said strike detecting grip handle being connected to the leading end of said handle, said strike detecting grip handle being spaced apart from and in parallel relationship with said fishing rod member, characterized in that said strike detecting grip handle has a reel pedestal fixing device mounted on the lower surface thereof, said strike detecting grip handle further having a strike amplifying elastic subsidary fishing rod connected to and fixedly secured to the leading end thereof, said strike amplifying elastic subsidary fishing rod having one or more fishing-line-guiding rings mounted on the leading end thereof, said strike amplifying elastic subsidary fishing rod being spaced apart from and in parallel relationship with said fishing rod member, or being spaced apart increasingly little by little from the latter towards the leading end thereof and also being in approximately parallel relationship with the latter, and the total length of said strike detecting grip handle and said strike amplifying elastic subsidary fishing rod being shorter than the length of said fishing rod member.

According to a fourth aspect of the present invention, there is provided a fishing rod wherein said reel pedestal fixing device is mounted on an inclined surface formed on the lower surface of either said handle or said strike detecting grip handle, said inclined surface being gradually sloped away from the axis of the fishing rod in the direction to the rear side of said handle.

DETAILED DESCRIPTION OF THE PREFERRED EMBODIMENTS

The present invention will now be described in detail below with reference to the accompanying drawings in which several preferred embodiments are shown.

Figure 1:
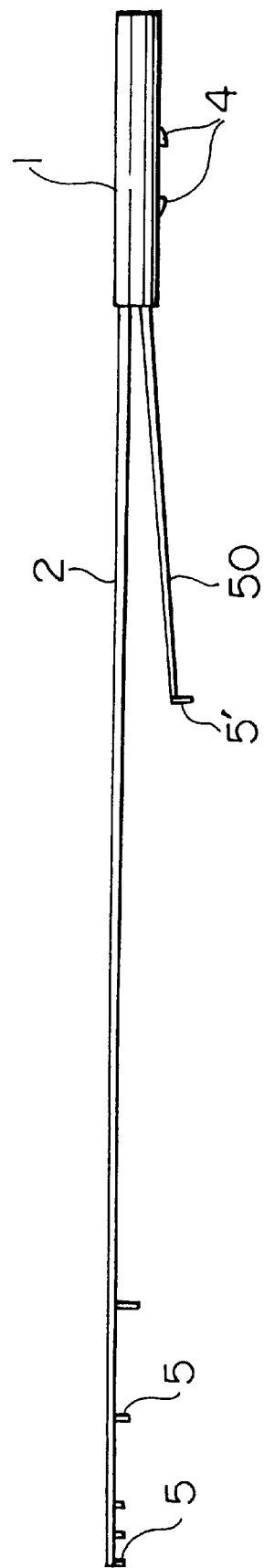
FIG. 1 is a side elevational view of a fishing rod according to a first exemplary embodiment of the present invention provided with a fishing rod member and a strike amplifying elastic subsidary fishing rod, both of which are connected to the leading end of a handle.

FIG. 1 is a side elevational view of a fishing rod according to a first exemplary embodiment of the present invention having a fishing rod member and a strike amplifying elastic subsidary fishing rod, which are connected to the leading end of the handle.

The fishing rod according to the first exemplary embodiment of the present invention comprises, for its basic arrangement, a handle 1, a fine fishing rod 2 fixedly secured to a position on one end of the handle 1, and a strike amplifying elastic subsidiary fishing rod 50 fixedly secured to another position on the same leading end of the handle 1, which is spaced apart from and in approximately parallel relationship with the fishing rod member.

As shown in FIG. 1, a reel pedestal fixing device 4 is fixedly secured to the lower surface of the handle 1. As for the reel pedestal fixing device 4, any type of device which is capable of fixedly securing the reel pedestal may be used.

Figure 2:
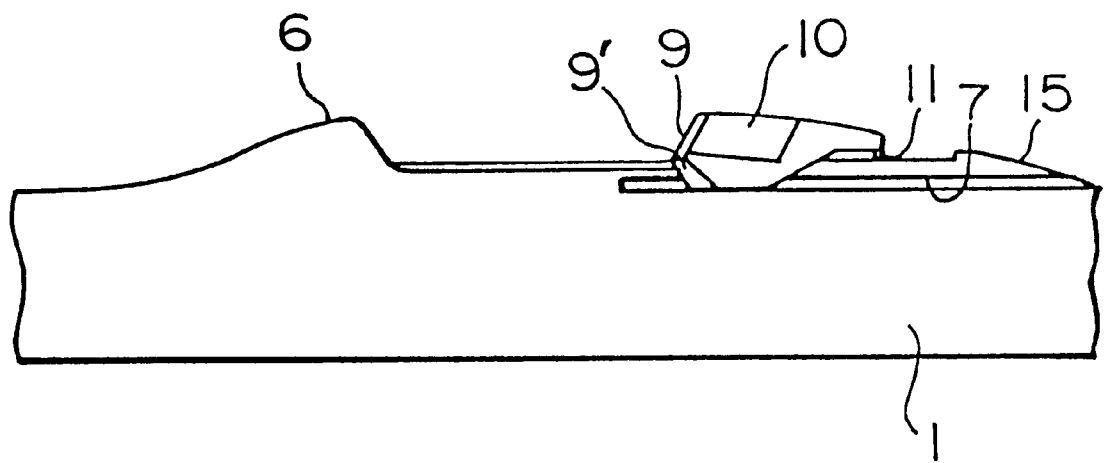
FIG. 2 is a side elevational view of a reel pedestal fixing device of the fishing rod according to the first exemplary embodiment of the present invention.

FIG. 2 is a side elevational view of the reel pedestal fixing device of the fishing rod according to the first exemplary embodiment of the present invention.

Figure 3:
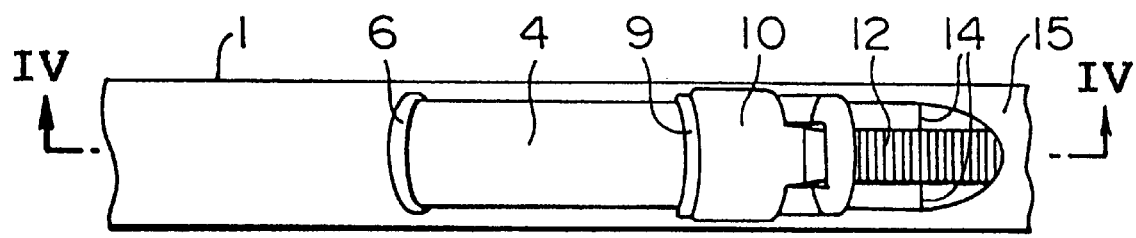
FIG. 3 is a plan view of the reel pedestal fixing device of the fishing rod according to the first exemplary embodiment of the present invention.

FIG. 3 is a plan view of the reel pedestal fixing device of the fishing rod according to the first exemplary embodiment of the present invention.

Figure 4:
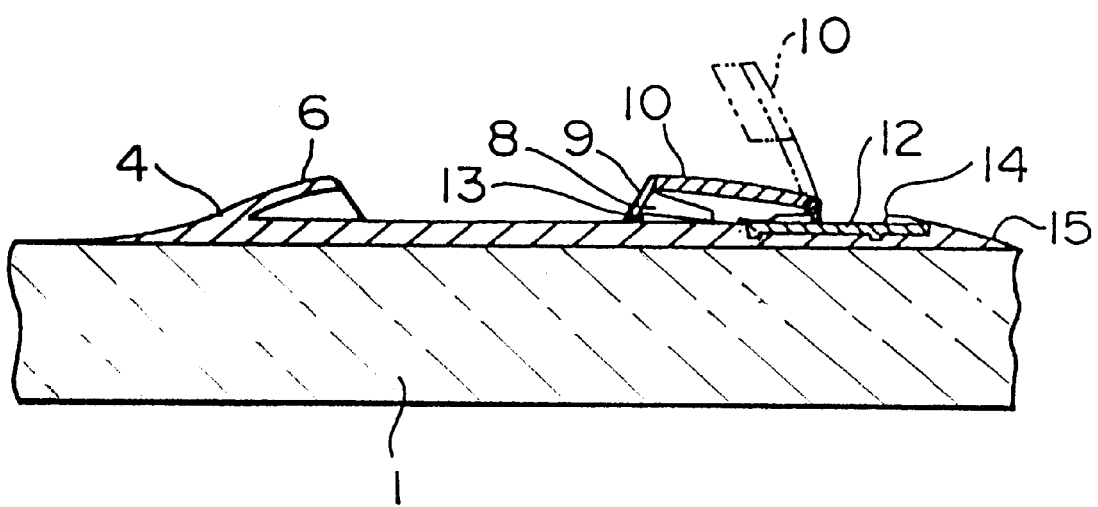
FIG. 4 is a sectional view of the reel pedestal fixing device of FIG. 3 taken along line IV—IV.

FIG. 4 is a sectional view of the reel pedestal fixing device taken along line IV—IV in FIG. 3.

This reel pedestal fixing device 4 has a fixed hood 6 formed integrally therewith on the lower side (outer side) of the handle 1, and a movable hood 9 arranged in opposed relationship with the fixed hood 6, the movable hood 9 having an engaging edge 9' adapted to slidably fit in an engaging groove 7 formd on both sides thereof, and a spacer 8 is mounted inside the movable hood 9.

In the rear of the above-mentioned movable hood 9, there is provided an engaging claw 11 adapted to be rendered operative by means of a clamping lever 10 which can be moved up and down freely. This engaging claw 11 is adapted to engage with or disengage from a claw receiving seat 12 which is fitted in and fixedly secured to the handle 1 by moving the clamping lever 10 up and down. Further, mounted in the rear of the above-mentioned spacer 8 of the movable hood 9 in the vicinity of the reel pedestal receiving portion is an engaging piece 13, which engages, when the movable hood 9 is slidably moved backwards, with a stopper 14 formed on the handle 1 on both sides of the claw receiving seat 12, to thereby prevent the movable hood 9 from slipping off. Still further, the outer end portion of the claw receiving seat 12 is formed in a smooth inclined portion 15 which becomes lower in level in the direction to the end of the handle 1.

The reel pedestal is inserted between the fixed hood 6 and the movable hood 9, and then can be fixedly secured thereto by engaging the engaging claw 11 with the claw receiving seat 12 by means of the clamping lever 10.

In the present invention, the reel pedestal fixing device 4 includes not only the above-mentioned arrangement wherein the reel pedestal is inserted between the fixed hood and the movable hood, but also another arrangement wherein the reel pedestal is inserted between the two movable hoods.

Further, five pieces of fishing-line-guiding rings 5 are fixedly secured to the lower surface of the fishing rod member 2 in the vicinity of the leading end thereof.

A srike amplifying elastic subsidiary fishing rod 50 is an elastic (as compared with the fishing rod member 2) subsidary fishing rod adapted to amplify the flexure of the fishing rod member 2 so that a strike can be easily detected by a fisherman, and has also a fishing-line-guiding ring 5' mounted on the lower surface of the leading end thereof.

Therefore, the strike amplifying elastic subsidiary fishing rod 50 is shorter than the fishing rod member 2 and is spaced apart at regular intervals from and in approximately parallel relationship with the fishing rod member 2. The passage that the subsidiary fishing rod 50 is approximately parallel with the fishing rod member 2 means that although the former is generally parallel with the latter, but the strike amplifying elastic subsidary fishing rod 50 is spaced apart increasingly little by little from the fishing rod member 2 in the direction to the leading end of the latter. If the strike amplifying elastic subsidary fishing rod 50 is approximately parallel with the fishing rod member 2, in case the reel pedestal fixing device 4 having a spinning reel 51 mounted thereon is put to use, a fishing line 52 let out from the reel becomes approximately parallel with the fishing rod member 2, and therefore the fishing line 52 may pass straightly through a fishing-line-guiding ring 5' mounted on the leading end of the strike amplifying elastic subsidary fishing rod 50, which results in smooth delivery of the fishing line 52 (refer to FIG. 11). Further, since the strike amplifying elastic subsidary fishing rod 50 has an elasticity, even when the fishing rod 2 is flexed to a large extent, the strike amplifying elastic subsidary fishing rod 50 will also be flexed correspondingly so that the strike amplifying elastic subsidiary fishing rod 50 is not allowed to contact the fishing rod member 2 with the result that the flexure of the latter is not impaired.

Figure 5:
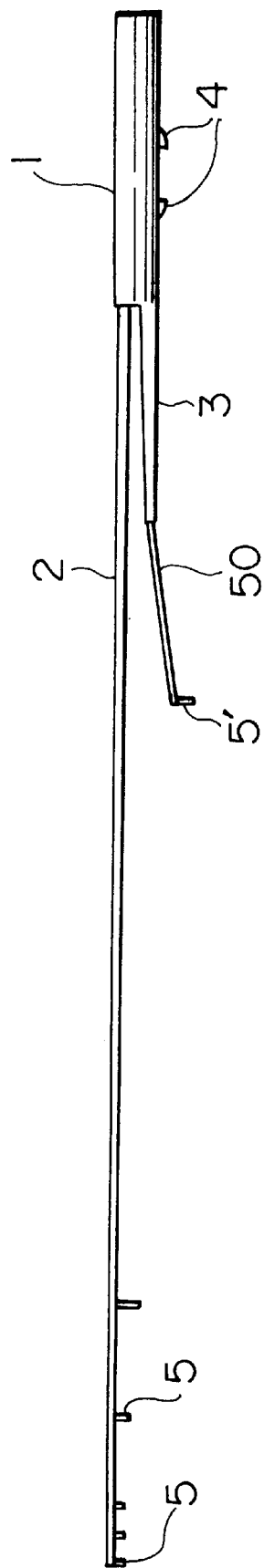
FIG. 5 is a side elevational view of a fishing rod according to a second exemplary embodiment of the present invention having a fishing rod member and a strike detecting grip handle, which are connected to the leading end of the handle, the strike detecting grip handle having a strike amplifying elastic subsidary fishing rod connected to the leading end thereof.

FIG. 5 is a side elevational view of a fishing rod according to the second exemplary embodiment of the present invention provided with a fishing rod member and a strike detecting grip handle, which are connected to the leading end of the handle, the strike detecting grip handle having a strike amplifying elastic subsidary fishing rod connected to the leading end thereof.

The fishing rod according to the second exemplary embodiment of the present invention has, for its basic arrangement, a fishing rod member 2 fixedly secured to a position on the leading end of a handle 1, and a strike detecting grip handle 3 which is fixedly secured to another position on the same (leading) end of the handle 1 and which is spaced apart from and in parallel relationship with the fishing rod member 2, the strike detecting grip handle 3 having a strike amplifying elastic subsidary fishing rod 50 connected to and fixedly secured to the leading end thereof, the strike amplifying elastic subsidary fishing rod 50 being spaced apart from and in approximately parallel relationship with the fishing rod member 2.

As shown in FIG. 5, the handle 1 has the same reel pedestal fixing device 4 as that of the first exemplary embodiment of the present invention mounted on the lower surface of the handle 1.

Further, five pieces of fishing-line-guiding rings 5 are mounted on the lower surface of the fishing rod member 2 in the vicinity of the leading end of the latter.

The strike detecting grip handle 3 has a suitable length to be held by a fisherman's hand or hands when fishing so that when a fish is hooked the sensitive vibration of the fishing rod member 2 can be detected by the fisherman holding the strike detecting grip handle 3 together with the fishing rod member 2, relative to the strike detecting grip handle 3 serving as the reference, and also the degree of flexure of the strike amplifying elastic subsidary fishing rod 50 can be adjusted.

The strike amplifying elastic subsidary fishing rod 50 has a fishing-line-guiding ring 5' mounted on the lower surface of the leading end thereof. The total length of the strike detecting grip handle 3 and the strike amplifying elastic subsidary fishing rod 50 is shorter than the length of the fishing rod member 2. Since the fishing line 52 extends through the fishing-line-guiding ring 5' mounted on the strike amplifying elastic subsidary fishing ring 50 and through 5 pieces of fishing-line-guiding rings 5 mounted on the fishing rod member 2, when a fish is hooked, the flexure of the fishing rod member 2 can be amplified by the action of the strike amplifying elastic subsidary fishing rod 50.

Figure 6:
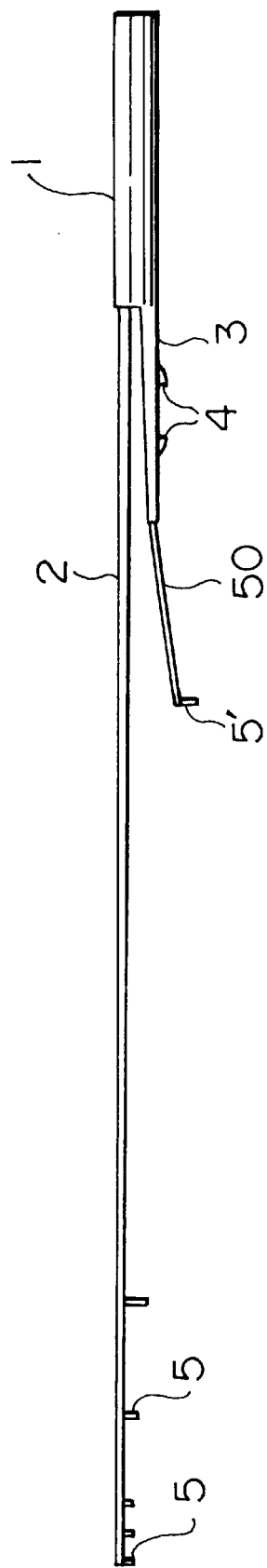
FIG. 6 is a side elevational view of a fishing rod according to a third exemplary embodiment of the present invention having a fishing rod member and a strike detecting grip handle, which are connected to the leading end of the handle, the strike detecting grip handle having a strike amplifying elastic subsidiary fishing rod connected to the leading end thereof.

FIG. 6 is a side elevational view of a fishing rod according to the third exemplary embodiment of the present invention having a fishing rod member and a strike detecting grip handle, which are connected to the leading end of the handle, the strike detecting grip handle having a strike amplifying elastic subsidary fishing rod connected to the leading end thereof.

The fishing rod according to the third exemplary embodiment of the present invention comprises the fishing rod according to the above-mentioned second exemplary embodiment wherein the reel pedestal fixing device 4 is not mounted on the lower surface of the handle 1, but is mounted on the lower surface of the strike detecting grip handle 3.

In the other exemplary embodiment of the present invention, the reel pedestal fixing device 4 is mounted on an inclined surface formed on the lower surface of either the handle 1 or the strike detecting grip handle 3. This inclined surface is formed such that it is gradually sloped away from the axis of the fishing rod in the direction to the rear side of the handle 1 (refer to FIG. 7 to FIG. 9).

Figure 7:
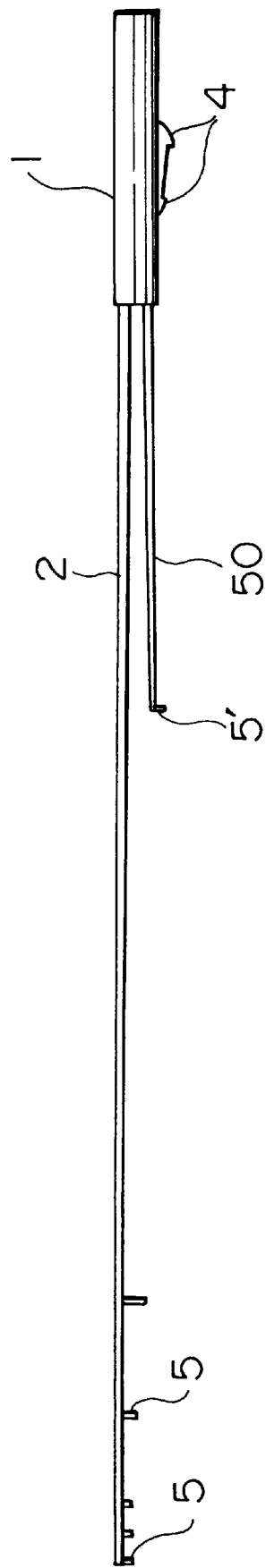
FIG. 7 is a side elevational view of a fishing rod according to one embodiment of the present invention which comprises the fishing rod according to the first exemplary embodiment of the invention having a reel pedestal fixing device mounted on an inclined surface formed on the lower surface of the handle.
Figure 8:
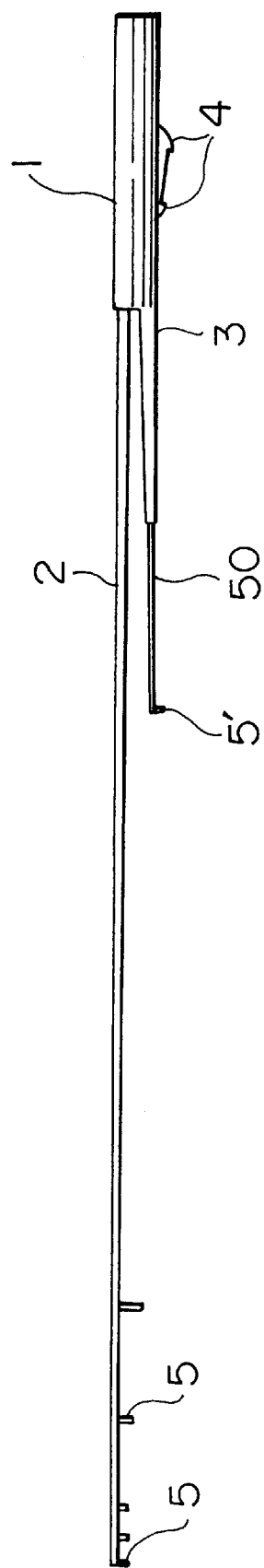
FIG. 8 is a side elevational view of a fishing rod according to another embodiment of the present invention which comprises the fishing rod according to the second exemplary embodiment of the invention having a reel pedestal fixing device mounted on an inclined surface formed on the lower surface of the handle.
Figure 9:
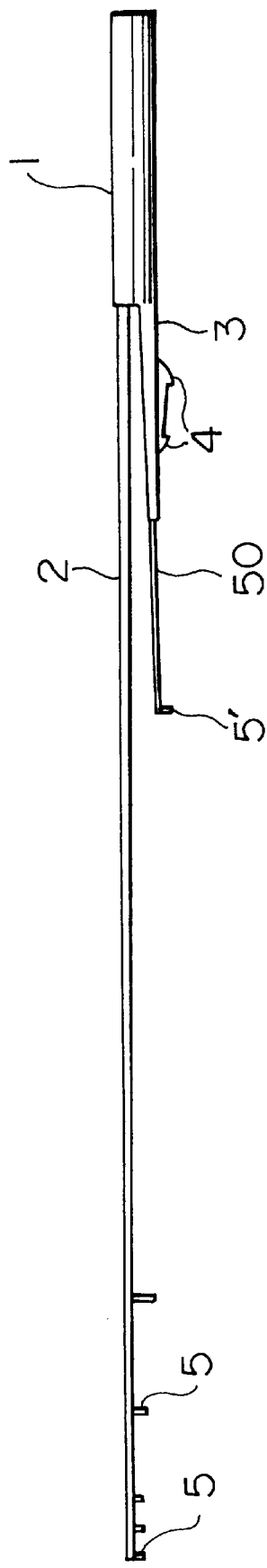
FIG. 9 is a side elevational view of a fishing rod according to a further embodiment of the present invention which comprises the fishing rod according to the third exemplary embodiment of the invention having a reel pedestal fixing device mounted on an inclined surface formed on the lower surface of a strike detecting grip handle.

FIG. 7 is a side elevational view of a fishing rod according to one embodiment of the present invention which comprises the fishing rod according to the first exemplary embodiment of the invention having a reel pedestal fixing device mounted on an inclined surface formed on the lower surface of the handle. FIG. 8 is a side elevational view of a fishing rod according to another embodiment of the present invention which comprises the fishing rod according to the second exemplary embodiment of the invention having a reel pedestal fixing device mounted on an inclined surface formed on the lower surface of the handle. FIG. 9 is a side elevational view of a fishing rod according to a further embodiment of the present invention which comprises the fishing rod according to the third exemplary embodiment of the invention having a reel pedestal fixing device mounted on an inclined surface formed on the lower surface of a strike detecting grip handle.

In a fishing rod having a spinning reel 51 installed on the reel pedestal fixing device 4, which is mounted on the inclined surface formed on the lower surface of either the handle 1 or the strike detecting grip handle 3, the fishing line 52 let out from the reel extends straightly through the fishing-line-guiding ring 5' fixedly secured to the leading end of the strike amplifying elastic subsidary fishing rod 50, and therefore the strike amplifying elastic subsidary fishing rod 50 is not approximately parallel with the fishing rod member 2, but is parallel with the latter.

According to a further embodiment of the present invention, the strike amplifying elastic subsidary fishing rod 50 has two pieces of fishing-line-guiding rings 5' mounted on the lower surface of the leading end thereof in spaced apart relationship. Therefore, the fishing line passing through the fishing-line-guiding rings 5' will have an angular change at the position of the guiding rings 5' in response to the amount of flexure of the fishing rod member 2 so that the fishing line may vibrate for amplification purposes, then the fishing-line-guiding rings 5' serving as a starting point of amplification, to thereby enable a fisherman to detect a strike easily.

Figure 10:
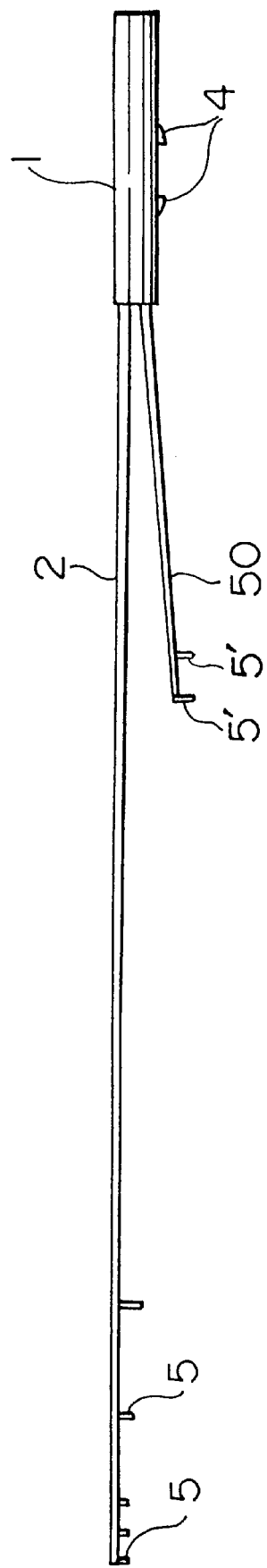
FIG. 10 is a side elevational view of a fishing rod according to a still further embodiment of the present invention which comprises the fishing rod according to the first exemplary embodiment of the invention wherein the strike amplifying elastic subsidary fishing rod has two pieces of fishing-line-guiding rings mounted on the leading end thereof in spaced apart relationship.

FIG. 10 is a side elevational view of a fishing rod according to a still further embodiment of the present invention which comprises the fishing rod according to the first exemplary embodiment of the invention wherein the strike amplifying elastic subsidary fishing rod has two pieces of fishing-line-guiding rings mounted on the leading end thereof in spaced apart relationship.

Both of the fishing rod member 2 and the strike amplifying elastic subsidary fishing rod 50 may be made of any of the various kinds of publicly known elastic materials, such as, glass fiber, carbon fiber and plastic materials. The handle 1 and the strike detecting grip handle 3 may be made of any of the various kinds of publicly known materials, such as, metals (aluminium, etc.) used to manufacture common handles, wood, bamboo and plastic materials. The handle 1 and the strike detecting grip handle 3 should preferrably be molded integrally.

Figure 11:
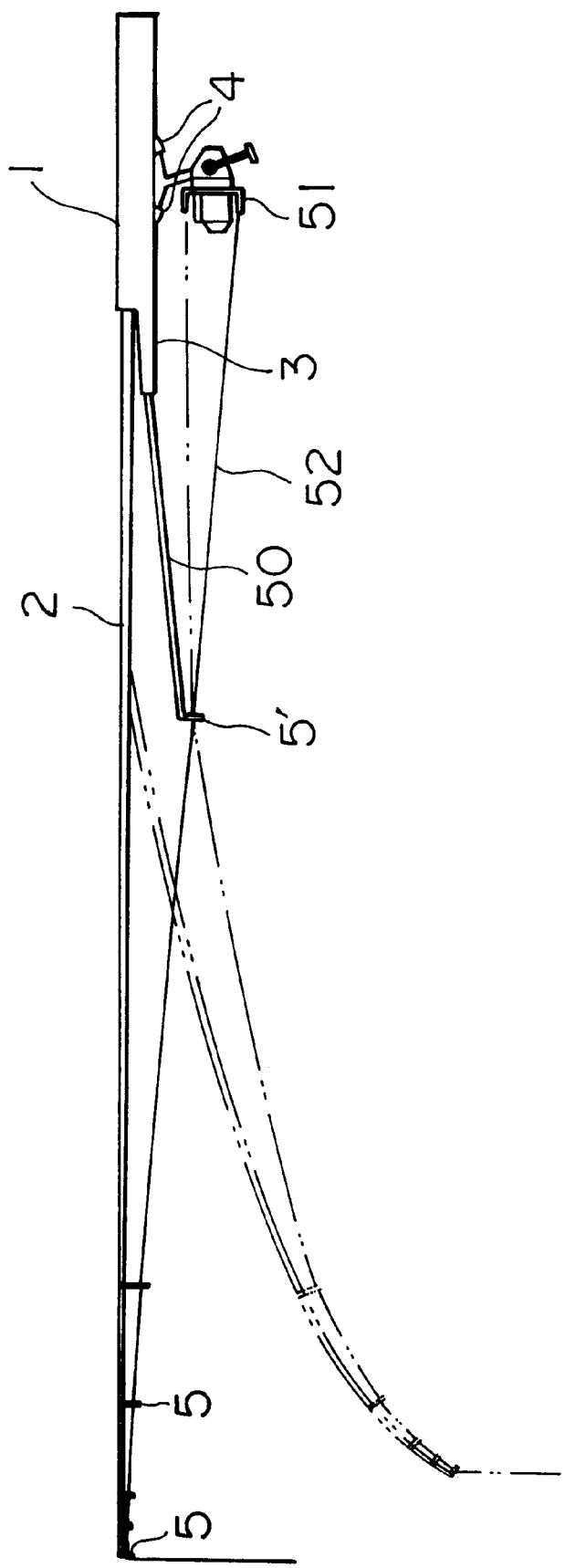
FIG. 11 shows the fishing rod according to the second exemplary embodiment of the present invention in use.

As described hereinabove, according to the fishing rod of the present invention, since a predetermined space is provided between the fishing rod member and the strike amplifying elastic subsidary fishing rod, and also the aforementioned two component parts are different in terms of their length and repulsion, the path or course of the fishing line is different from those of the prior art fishing rods, and therefore when a fish is hooked, it is possible to detect a strike more clearly and sensitively by amplifying a slight tension on the fishing line and the flexure of the fishing rod based on the tension, then the fishing-line-guiding ring(s) mounted on the leading end of the strike amplifying elastic subsidary fishing rod serving as a starting point of the amplification of the strike (refer to FIG. 11). Further, in the fishing rod of the present invention provided with the strike detecting grip handle, the flexure of the fishing rod member amplified by the action of the strike amplifying elastic subsidary fishing rod can be detected by a fisherman's hand or hands. Therefore, the fishing rod according to the present invention having a spinning reel mounted thereon is most suitable for fishing on board a ship, such as, a boat and a yacht, etc.

It is to be understood that the foregoing description is merely illustrative of preferred embodiments of the present invention, and that the scope of the invention is not to be limited thereto, but is to be determined by the scope of the appended claims.

What is claimed is:

1. A fishing rod comprising: a handle having a reel pedestal fixing device mounted on the lower surface thereof, a fishing rod member having one or more fishing-line-guiding rings mounted on the lower surface thereof, and a strike detecting grip handle which is located below the fishing rod member, said fishing rod member and said strike detecting grip handle being connected to the leading end of said handle, said strike detecting grip handle being spaced apart from and in parallel relationship with said fishing rod member, characterized in that said strike detecting grip handle further has a strike amplifying elastic subsidary fishing rod connected to and fixedly secured to the leading end thereof, said strike amplifying elastic subsidary fishing rod having one or more fishing-line-guiding rings mounted on the leading end thereof, said strike amplifying elastic subsidary fishing rod being spaced apart from and in parallel relationship with said fishing rod member, or being spaced apart increasingly little by little from the latter towards the leading end thereof and also being in approximately parallel relationship with the latter, and the total length of said strike detecting grip handle and said strike amplifying elastic subsidary fishing rod being shorter than the length of said fishing rod member.

2. A fishing rod comprising: a handle, a fishing rod member having one or more fishing-line-guiding rings mounted on the lower surface thereof, and a strike detecting grip handle which is located below the fishing rod member, said fishing rod member and said strike detecting grip handle being connected to the leading end of said handle, said strike detecting grip handle being spaced apart from and in parallel relationship with said fishing rod member, characterized in that said strike detecting grip handle has a reel pedestal fixing device mounted on the lower surface thereof, said strike detecting grip handle further having a strike amplifying elastic subsidary fishing rod connected to and fixedly secured to the leading end thereof, said strike amplifying elastic subsidary fishing rod having one or more fishing-line-guiding rings mounted on the leading end therof, said strike amplifying elastic subsidary fishing rod being spaced apart from and in parallel relationship with said fishing rod member, or being spaced apart increasingly little by little from the latter towards the leading end thereof and also being in approximately parallel relationship with the latter, and the total length of said strike detecting grip handle and said strike amplifying elastic subsidary fishing rod being shorter than the length of said fishing rod member.

3. A fishing rod as claimed in claim 1, wherein said reel pedestal fixing device is mounted on an inclined surface formed on the lower surface of either said handle or said strike detecting grip handle, said inclined surface being gradually sloped away from the axis of the fishing rod in the direction to the rear side of said handle.

4. A fishing rod as claimed in claim 2, wherein said reel pedestal fixing device is mounted on an inclined surface formed on the lower surface of either said handle or said strike detecting grip handle, said inclined surface being gradually sloped away from the axis of the fishing rod in the direction to the rear side of said handle.

* * * * *